United States Patent [19]

Carnes

[11] 3,759,327
[45] Sept. 18, 1973

[54] INTERNALLY CATALYZED WELL CONSOLIDATION METHOD

[75] Inventor: James D. Carnes, Duncan, Okla.

[73] Assignee: Halliburton Company, Duncan, Okla.

[22] Filed: Jan. 7, 1972

[21] Appl. No.: 216,223

Related U.S. Application Data

[60] Division of Ser. No. 72,889, Sept. 16, 1970, abandoned, which is a continuation-in-part of Ser. No. 840,521, July 9, 1969, abandoned.

[52] U.S. Cl. ............................................. 166/295
[51] Int. Cl. .......................................... E21b 33/138
[58] Field of Search ........................... 166/295, 294; 61/36 R

[56] References Cited
UNITED STATES PATENTS

| | | | |
|---|---|---|---|
| 3,537,522 | 11/1970 | Harnsberger | 166/295 |
| 2,345,611 | 4/1944 | Lerch et al. | 166/295 |
| 2,349,181 | 5/1944 | Lerch et al. | 166/295 |
| 2,796,934 | 6/1957 | Vogel | 166/295 |
| 3,282,338 | 11/1966 | Walther et al. | 166/295 |
| 3,404,735 | 10/1968 | Young et al. | 166/295 |

*Primary Examiner*—Stephen J. Novosad
*Attorney*—John H. Tregoning

[57] ABSTRACT

A method is disclosed for permeably consolidating sands in a well wherein a consolidating fluid comprising a hydrocarbon carrier, an acid catalyzed resin or resin-forming material, sand and an acid-producing material are introduced into an incompetent earth formation where acid is produced by the acid-producing material, causing the resin to harden. Specific acid-producing materials are disclosed as catalysts which comprise surfactants which release acid upon heating and ammonium salts which hydrolyze to produce an acid.

5 Claims, No Drawings

3,759,327

INTERNALLY CATALYZED WELL CONSOLIDATION METHOD

CROSS-REFERENCE TO RELATED APPLICATIONS

This is a division of application Ser. No. 72,889, filed September 16, 1970 now abandoned, which is a continuation-in-part of application Serial No. 840,521, filed July 9, 1969, also now abandoned.

The field of the invention concerns processes for consolidating incompetent materials, such as in well formations, utilizing resinous compositions. The invention concerns catalyst systems which permit the elimination of an overflushing step commonly used to introduce a catalyst into a hardenable resin after the resin has been placed in a subterranean formation.

Sand consolidation systems are commonly used to consolidate sand in a formation surrounding a well bore to thereby reduce the tendency of sand to be carried out of the well together with the fluid being produced. Such production of sand is undesirable because it causes sand to fill the well bore and also results in damage to production equipment. Sand consolidation bonds the loose sand particles together, creating a fluid-permeable zone which prevents flow of sand from the formation and yet permits the flow of fluid through the zone. Processes for sand consolidation are disclosed in U.S. Pat. Nos. 3,404,735; 3,209,826 and 3,199,590 granted to Young et al. which are hereby incorporated by reference. Other uses of sand consolidation resins include the formation of sand screens. This process is described in U.S. Pat. No. 3,361,203 granted to Rensvold.

The Young et al. patents disclose processes whereby a resin and a liquid hydrocarbon substantially immiscible with the resin are mixed together and placed into the well. The resin-containing mixture is subsequently cured by placing a catalyst-containing overflush fluid into the well. Surface active agents and a material such as a silane, to improve the resin-sand bond are commonly incorporated with the resin mixture before it is introduced into the well.

It has been found that in certain well formations the above described process may not result in a properly cured resin layer. If the formation contains a zone which is highly permeable, a substantial portion of the catalyst-containing overflush may be drawn off in such zone and thereby passing some of the previously placed resin so that curing of the resin does not occur. For instance, a shale streak may result in a loss of catalyst and an improperly cured consolidation system.

Early attempts to add a catalyst to the resin mixture before placing the mixture in the well often caused the resin mixture to substantially cure before it could be completely placed in the well resulting in setting of resin in the casing. When the catalyst concentration was decreased to prevent this, the result was that the resin would not cure satisfactorily after being placed in the well.

This invention provides a method for permeably consolidating an incompetent subterranean formation wherein a consolidating fluid comprising a hydrocarbon carrier, an acid catalyzed resin or resin-forming material, sand and an acid-producing material are introduced into the incompetent earth formation; and the acid-producing material is allowed to produce an acid whereupon the acid causes the resin or resin-forming material to harden, thereby permeably consolidating the incompetent formation.

The acid-producing materials used in this invention may be ammonium salts of organic or inorganic acids. Ammonium salts of organic acids have the formula: $RNH_4$ where R is an organic constituent which will generate acid when the ammonium compound is added to an aqueous system. Ammonium salts of inorganic acids have the formula: $XNH_4$ where X is an inorganic constitutent which will generate acid when the ammonium compound is added to water.

When formations having temperatures greater than about 160° are sought to be consolidated by the method of the present invention, a material which will produce acid upon heating may be used as the acid-producing element.

The preferred material for releasing acid upon exposure to heat is a surfactant described in U.S. Pat. No. 2,946,747, which contains monoamyl, diamyl and triamyl napthalene sulfonates neutralized with butylamine, and which has been found to produce sulfonic acid when heated to about 160° F or greater.

The ammonium compounds must be water soluble. By water soluble it is intended that the compound be soluble in water in an amount sufficient to permit a concentration which will cause a substantial curing of the resin. The inorganic or organic acid produced from the ammonium salts must also be soluble in water in an amount sufficient to yield a concentration which will result in a substantial curing of the resin.

Although any ammonium salt which is sufficiently water soluble and which produces an acid which is sufficiently water soluble may be used in practicing this invention, the following salts have been found to be particularly effective: ammonium formate, ammonium oxalate, ammonium bisulfite, ammonium bisulfate, ammonium phosphate (monobasic), ammonium phosphate (dibasic), ammonium nitrate, ammonium sulfamate, ammonium sulfate and ammonium sulfite.

Various techniques for improving the efficacy of sand consolidation systems are described in the Young et al. U.S. Pat. No. 3,404,735 which has been incorporated by reference. Thus, resin concentration ranges, sand concentration and the like are not repeated in detail in this application. These techniques include the addition of surface active agents such as blends of alkylaryl sulfonates and complex nonionics such as those sold under the tradename HYFLO or cationic surfactant blends such as those sold under the tradename AQUANESS AC-165 (5N). Further, silanes may also be incorporated with the resin to increase the bonding strength between the resin and the sand. These techniques are also useful in the practice of this invention and the invention described herein relates to an improvement in the means of curing the resin rather than the above described means for improving resinous sand consolidation systems.

Because the method of this invention utilizes an internal catalyst, no oil spacer or afterflush is needed. However, these may be used if desired.

Furan resins of various types are useful with the delayed catalysts of this invention. Such resins include: monopolymers of furfuryl alcohol, resins obtained by condensation of phenol with furfuryl alcohol and furfuryl-ketone polymers.

Other acid-cured resins may be substituted in approximately equal parts per volume for the furan resins.

Suitable acid-curing resins include phenol formaldehyde resins and urea formaldehyde resins.

When the acid-producing surfactant is used as the delayed action catalyst, it must be used in concentrations sufficient to produce permeable consolidations which will withstand commonly encountered formation pressures. This will require surfactant concentrations ranging from about 0.3 gallons of surfactant per gallon of resin at temperatures of about 300° F to about 1.0 gallon of surfactant per gallon of resin at temperatures of about 160° F. These concentrations assume a resin concentration of from about 1.5 to about 5 gallons of resin per sack of sand in the hydrocarbon carrier or in the subterranean formation.

The following examples are given to more fully describe certain aspects of the invention set out above and are given primarily for the purpose of illustration; and the invention, in its broader aspects, is not to be construed as limited thereto.

EXAMPLE I

A well in Matagorda County, Texas was consolidated utilizing the procedure of this invention. The interval to be treated was washed for about a day and a half. A sand concentration of about three-fourths pound per gallon of carrying fluid was utilized. The sand was added to a hopper at the top of a sand-oil barrel.

A 20-barrel blending tank was first filled with 18 barrels of diesel oil. The following resin mix was dispersed with a densometer pump in a 125-gallon tank:

52.5 gallons furfuryl alcohol resin 2 quarts Silane A-1100 (Silane A-1100 is gamma aminopropyl triethoxy silane.)

52.5 gallons furfuryl alcohol 2 quarts cationic surfactant blend sold under the tradename AQUANESS AC-165(5N)

8.9 pounds ammonium bisulfate dissolved in 13 gallons of water

A quantity of this resin-catalyst mixture in the concentration of 1 gallon per 100-pound sack of 40–60 mesh sand was added manually to the 20-barrel blending tank. The internally catalyzed resin-oil dispersion was then pumped through the sand-oil barrel where sufficient sand was added to make a concentration of 0.8 pounds per gallon of carrying fluid. This dispersion was then introduced into the well. More diesel oil and resin-catalyst solution was added to the blending tank periodically to replace that which had been pumped out. About 65 sacks of sand were placed before a sand-out occurred.

The well was left shut in overnight after which time the tubing was reversed out with salt water. After one week the sand in the well bore was drilled out, the well was placed in production and no sand was produced.

The estimated formation temperature was 160° F.

EXAMPLE II

Various ammonium salts were tested in the laboratory by the following procedure. The following resin mixture was used:

100 parts by volume furfuryl alcohol resin 1 part by volume Silane A-1100 (Silane A-1100 is gamma aminopropyl triethoxy silane.)

100 parts by volume furfuryl alcohol 1 part by volume cationic surfactant blend sold under the tradename AQUANESS AC-165(5N)

This resin mixture was combined with an aqueous solution of the catalyst to be tested in a ratio of 6 parts by volume resin to one part catalyst solution. This resin-catalyst mix was then dispersed in the carrying fluid which was No. 1 diesel oil. This dispersion was agitated and 40–60 mesh Ottawa sand was added. Sand concentration was equivalent to two pounds per gallon of carrying fluid while the internally-catalyzed resin quantity was based on the sand at 1.5 gallons per 100-pound sack of sand. The laboratory quantities were as follows:

Carrying fluid — 200 milliliters

Internally-catalyzed resin — 6 milliliters sand — 48 grams

The sand was coated immediately upon contact with the internally catalyzed resin dispersed in oil. The resin coated solids were then packed in a 1-inch inside diameter by 6⅝-inch glass tube to a height of 2½ inches. The glass tube was equipped with an outlet at the opposite of the injection end. The carrying fluid was flushed through the packed solids at 80° F and 10 pounds per square inch gauge pressure. The packed glass tube was then placed in a water bath at the listed cure, time and temperature. The results are as follows:

Table I

Consolidation Strengths of Resin Dispersion Sand Pack With Internal Catalysts[a]

| Chemical Name | Catalyst Solution Strength, Wt.%[b] | Cure Temp. °F. |
|---|---|---|
| Ammonium formate No. 1 | 25 | 200 |
| Ammonium oxalate No. 2 | 10 | 200 |
| Ammonium bisulfite No. 3 | 25 | 160 |
| Ammonium bisulfite No. 4 | 50 | 160 |
| Ammonium phosphate (monobasic) No. 5 | 25 | 160 |
| Ammonium phosphate (dibasic) No. 6 | 25 | 200 |
| Ammonium nitrate No. 7 | 25 | 160 |
| Ammonium sulfamate No. 8 | 25 | 160 |
| Ammonium sulfamate No. 9 | 15 | 180 |
| Ammonium sulfate No. 10 | 15 | 160 |
| Ammonium sulfate No. 11 | 25 | 160 |
| Ammonium sulfite No. 12 | 15 | 160 |
| Ammonium sulfite No. 13 | 25 | 160 |

| Chemical Name | Cure Time, Hrs. | 80°F Compressive Strength, PSI[c] |
|---|---|---|
| Ammonium formate No. 1 | 72 | 86 |
| Ammonium oxalate No. 2 | 24 | 2630 |
| Ammonium bisulfite No. 3 | 24 | 68 |
| Ammonium bisulfite No. 4 | 72 | 2095 |
| Ammonium phosphate(monobasic) No. 5 | 24 | 1170 |
| Ammonium phosphate (dibasic) No. 6 | 72 | 1588 |
| Ammonium nitrate No. 7 | 24 | 2591 |
| Ammonium sulfamate No. 8 | 24 | 2125 |
| Ammonium sulfamate No. 9 | 24 | 4071 |
| Ammonium sulfate No. 10 | 24 | 2700 |
| Ammonium sulfate No. 11 | 24 | 3391 |
| Ammonium sulfate No. 12 | 72 | 2080 |
| Ammonium sulfite No. 13 | 72 | 2072 |

[a]These tests were made with no circulation time to simulate placement of the solids.
[b] Solution is water solution of catalyst.
[c]Compressive strength of the 40–60 pack sand was measured after the core has been cooled at room temperature (80°F).

EXAMPLE III

Laboratory tests were run to determine the working time for ammonium bisulfate. A cement consistometer was used for circulating the resin sand dispersion. The resin-sand dispersion was agitated in the consistometer for a length of time required to reach the circulating bottom hole temperature (BHT) as determined from the casing-cementing tables of the API Recommended Practice for Testing Oil Well Cements and Cement Additives. During the time of agitation the temperature was gradually raised from 80°F to the circulating bottom hole temperature. The containers were then removed from the consistometer and the excess carrying fluid poured off and the resin coated solids were packed into 6-inch by ⅞-inch ID glass tubes. The tubes were then increased from the circulating BHT to the static BHT. The condition of the sand was observed at the end of this period as shown in Table II. The specimens were cured at the static BHT for 24 hours in a water bath after which time the compressive strengths were determined and are reported in Table III.

Table II

Working Time Tests of Internally Catalyzed Systems

| Test No. | Resin Catalyst Formula | Static BHT, °F | Circulating BHT, °F |
|---|---|---|---|
| 1 | Resin 6 pbv: Catalyst (15% NH₄HSO₄), 1 pbv | 134 | 103 |
| 2 | Resin, 8 pbv: Catalyst (8% NH₄HSO₄), 1 pbv | 134 | 103 |
| 3 | Resin, 8 pbv: Catalyst (8% NH₄HSO₄), 1 pbv | 164 | 113 |
| 4 | Resin, 10 pbv: Catalyst (8% NH₄HSO₄), 1 pbv | 164 | 113 |

| Test No. | Circulating Time to Reach Static BHT | Condition of Resin-Coated Solids |
|---|---|---|
| 1 | 2 hrs, 15 mins. | No hardening of resin noticeable. |
| 2 | 2 hrs, 15 mins. | No hardening of resin at all. |
| 3 | 2 hrs, 7 mins. | Resin still soft. |
| 4 | 2 hrs, 7 mins. | Resin still soft. |

Table III

Consolidation Strengths of Internally Catalyzed Systems

| Test No. | Resin Catalyst Formula | Cure Temp. °F. | Cure Time Hrs. | 80°F Consolidation Strength PSI |
|---|---|---|---|---|
| 1 | Resin, 6 pbv: Catalyst (15% NH₄HSO₄), 1 pbv | 134 | 24 | 1383 |
| 2 | Resin, 8 pbv: Catalyst (8% NH₄HSO₄), 1 pbv | 134 | 24 | Did not Set |
| 3 | Resin, 8 pbv: Catalyst (8% NH₄HSO₄), 1 pbv | 164 | 24 | 1598 |
| 4 | Resin, 10 pbv: Catalyst (8% NH₄HSO₄), 1 pbv | 164 | 24 | 1134 |

EXAMPLE IV

The chemical resistance of an internally catalyzed system was determined. The resin mixture of Example II was utilized together with one pound of 40–60 mesh sand per gallon of Duncan No. 2 diesel oil carrying fluid. The combination of resin, sand, carrying fluid and ammonium bisulfate were mixed by agitation with an electric stirrer. The dispersion was then placed in a stainless steel consistometer which was provided with a water bath. The stirrer was operated for one hour to simultate the placement time and then the resin coated solids were packed into a thin walled glass tube one-inch OD by 6 inches long. These samples were cured in a water bath at the desired formation temperature. The glass tube was then broken away and the core tested. The results were as follows:

Table IV

Chemical Resistance of Internally Catalyzed System

| Test No. | Catalyst Strength Wt. NH₄HSO₄ | Resin/Catalyst Ratio, by Vol. | Cure Temp. °F | Circulation Temp. °F |
|---|---|---|---|---|
| 5 | 25 | 10:3 | 100 | 100 |
| 6 | 25 | 10:3 | 110 | 110 |
| 7 | 15 | 6:1 | 120 | 120 |
| 8 | 15 | 6:1 | 130 | 130 |
| 9 | 8 | 8:1 | 140 | 140 |
| 10 | 8 | 8:1 | 150 | 150 |
| 11 | 8 | 10:1 | 160 | 160 |

| Test No. | Consolidation Time, Hrs. | Chemical Test | 80°F Consolidation Strength, PSI Before | After |
|---|---|---|---|---|
| 5 | 24 | 5 hrs boil in fresh water | 554 | 961 |
| 6 | 25 | 4 hrs boil in fresh water | 710 | 902 |
| 7 | 24 | 6 hrs boil in brine | 500 | 1746 |
| 8 | 24 | 4 hrs boil in fresh water | 1046 | 927 |
| 9 | 24 | 6 hrs boil in brine | 807 | 1854 |
| 10 | 24 | 5 hrs boil in brine | 914 | 934 |
| 11 | 24 | 5 hrs in 200°F oil | 387 | 768 |

EXAMPLE V

Twenty-three samples of an internally catalyzed material for permeably consolidating sand are prepared as follows. To No. 1 diesel oil, various concentrations of the surfactant described in U.S. Pat. No. 2,946,747 are added. With constant stirring, various concentrations of furan resin and 40–60 Ottawa sand are then added to each sample. Each dispersion is circulated for various lengths of time at various temperatures to simulate pumping. Then the coated solids are packed in a glass tube above a portion of Oklahoma No. 1 sand, representing formation sand. The packed sands are then cured for 24 hours at various temperatures; and, after curing, the resulting consolidations are tested for compressive strength. Table V below indicates useful permeable sand consolidations are formed with resins internally catalyzed by a surfactant which produces acid in the presence of heat.

The delayed action internal catalysts of this invention may be utilized both with sand consolidation processes wherein sand or other particulated solid is mixed with the resin prior to its introduction into the formation and those where the resin-containing liquid is introduced into the well substantially free of added particulated solids. Further, the resin may be mixed with any suitable carrying fluid prior to being introduced into the well formation. It is not necessary that the carrying fluid be totally immiscible with resin and a limited amount of solubility is permissible. Thus, the invention may be embodied in other specific forms not departing from the spirit or central characteristics thereof and the scope of the invention is indicated by the claims which follow.

TABLE V

| Sand conc., lbs./gal. | Resin-sand ratio, gals./sk. | Surfactant conc., gal./gal. resin [a] | Temp., °F. Circ. temp.[b] | Temp., °F. Cure or BHT | Time Circ., min.[c] | Time Cure, hrs. | Compressive strength, p.s.i. 40-60 |
|---|---|---|---|---|---|---|---|
| 1 | 1.5 | 0.5 | 125 | 170 | 60 | 24 | 930 |
| 1 | 5 | 0.5 | 125 | 170 | 60 | 24 | 0 |
| 2.5 | 1.5 | 0.5 | 125 | 170 | 60 | 24 | 187 |
| 2.5 | 1.5 | 1 | 125 | 170 | 60 | 24 | 3,420 |
| 2.5 | 5 | 1 | 125 | 170 | 60 | 24 | 2,010 |
| 2.5 | 5 | 0.5 | 125 | 170 | 60 | 24 | 0 |
| 1 | 5 | 1 | 125 | 170 | 60 | 24 | 2,578 |
| 0.5 | 2 | 1 | 130 | 180 | 45 | 24 | 6,607 |
| 0.5 | 5 | 0.5 | 130 | 180 | 45 | 24 | 5,214 |
| 1.5 | 2 | 1 | 130 | 180 | 45 | 24 | 5,411 |
| 1.5 | 5 | 0.5 | 130 | 180 | 45 | 24 | 0 |
| 0.5 | 2 | 0.5 | 170 | 240 | 60 | 24 | 5,732 |
| 0.5 | 5 | 0.5 | 170 | 240 | 60 | 24 | 2,036 |
| 1.5 | 2 | 0.5 | 170 | 240 | 60 | 24 | 9,530 |
| 1.5 | 5 | 0.5 | 170 | 240 | 60 | 24 | 3,930 |
| 1 | 1.5 | 0.2 | 170 | 230 | 90 | 24 | 8,089 |
| 1 | 5 | 0.2 | 170 | 230 | 90 | 24 | 1,178 |
| 1 | 1.5 | 0.4 | 170 | 230 | 90 | 24 | 8,765 |
| 1 | 5 | 0.4 | 170 | 230 | 90 | 24 | 8,940 |
| 0.5 | 1.5 | 0.5 | 170 | 230 | 90 | 24 | 4,590 |
| 0.5 | 5 | 0.5 | 170 | 230 | 90 | 24 | 4,553 |
| 1 | 1.5 | 0.5 | 170 | 230 | 90 | 24 | 9,678 |
| 1 | 5 | 0.5 | 170 | 230 | 90 | 24 | 7,339 |

[a] These tests were made with no circulation time to simulate placement of the solids.
[b] Solution is water solution of catalyst.
[c] Compressive strength of the 40-60 pack sand was measured after the core had been cooled at room temp. (80° F.).

What is claimed is:

1. A method of permeably consolidating incompetent subterranean formations having temperatures above about 160° F, which comprises the steps of:
   injecting a consolidating mixture into an incompetent subterranean formation having a temperature of at least about 160° F, said consolidating mixture comprising an acid curable resin-forming material and a catalyst selected from the group consisting of monoamyl, diamyl and triamyl napthalene sulfonate and mixtures thereof neutralized with butylamine, which will produce acid upon heating to 160° F to cure said acid curable resin and
   maintaining said mixture in said formation for a sufficient time to permit substantial curing of said resin-forming material.

2. The process of claim 1 wherein the resin-forming fluid is selected from the group consisting of furan resin, phenol formaldehyde resin and urea formaldehyde resin.

3. The process of claim 1 wherein the resin is furan resin.

4. The process of claim 1 wherein said catalyst is present in a concentration of from about 0.3 gallon per gallon of resin-forming fluid to about 1.0 gallon per gallon of resin-forming fluid.

5. The process of claim 1 characterized by the additional step, following the step of adding an acid catalyzed resin, of:
   adding to the mixture of hydrocarbon liquid, resin-forming fluid and catalyst from about 0.25 to about 5 pounds per gallon of a particulated solid.

* * * * *